United States Patent [19]
Keith et al.

[11] 3,908,942
[45] Sept. 30, 1975

[54] MOUNTING MEANS FOR TELEVISION SETS AND THE LIKE

[75] Inventors: Glen R. Keith; Ronald B. Thompson, both of Morton, Ill.

[73] Assignee: Morton Metalcraft Co., Morton, Ill.

[22] Filed: Apr. 25, 1974

[21] Appl. No.: 464,035

[52] U.S. Cl. .................... 248/158; 70/58; 108/48; 109/52; 248/203; 248/278; 248/346; 403/12
[51] Int. Cl.² ................................... A47G 29/00
[58] Field of Search ........... 248/415, 203, 158, 278, 248/418, 310, 346, 349; 403/11, 12; 285/117, 3, 4; 70/58, 62; 109/50, 51, 52; 85/45; 211/4; 108/48

[56] References Cited
UNITED STATES PATENTS

| | | | |
|---|---|---|---|
| 1,837,501 | 12/1931 | Sunnes | 248/203 |
| 1,970,178 | 8/1934 | Michlun | 109/50 |
| 2,085,975 | 7/1937 | Hauf | 109/52 |
| 2,103,944 | 12/1937 | Gullborg | 85/45 |
| 2,245,951 | 6/1941 | Agee | 108/48 |
| 3,229,948 | 1/1966 | King | 248/346 |
| 3,291,432 | 12/1966 | Lucasey | 248/203 |
| 3,349,531 | 10/1967 | Watson | 403/11 |
| 3,559,942 | 2/1971 | Lucasey | 248/278 |
| 3,564,879 | 2/1971 | Bennett | 70/58 |
| 3,724,798 | 4/1973 | Lucasey | 248/203 |

Primary Examiner—Marion Parsons, Jr.
Attorney, Agent, or Firm—Hill, Gross, Simpson, Van Santen, Steadman, Chiara & Simpson

[57] ABSTRACT

Mounting means for a television set, stereophonic equipment, and similar items, said means being designed to discourage theft of the mounted article, and comprising a mounting plate to be secured to the bottom of an article and a complementary supporting bearing plate to be secured to a supporting means, the plates being in bearing relation to one another. The bearing plate has upwardly extending angular connecting flanges which engage interlockingly through slots in the mounting plate. Means are provided for releasingly locking the plates against relative rotary unlocking movement.

7 Claims, 12 Drawing Figures

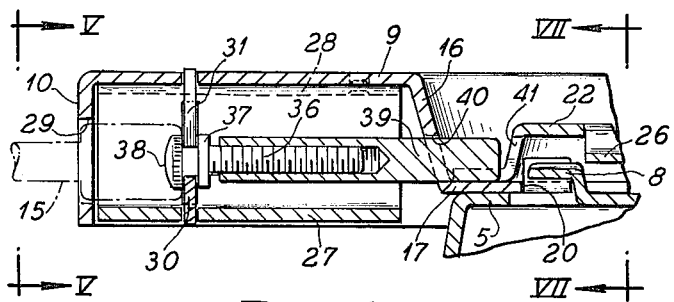
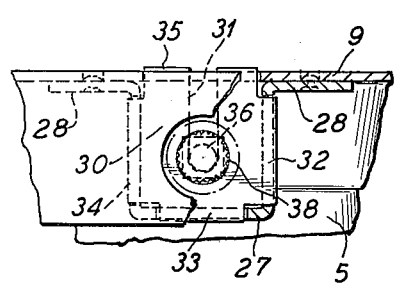
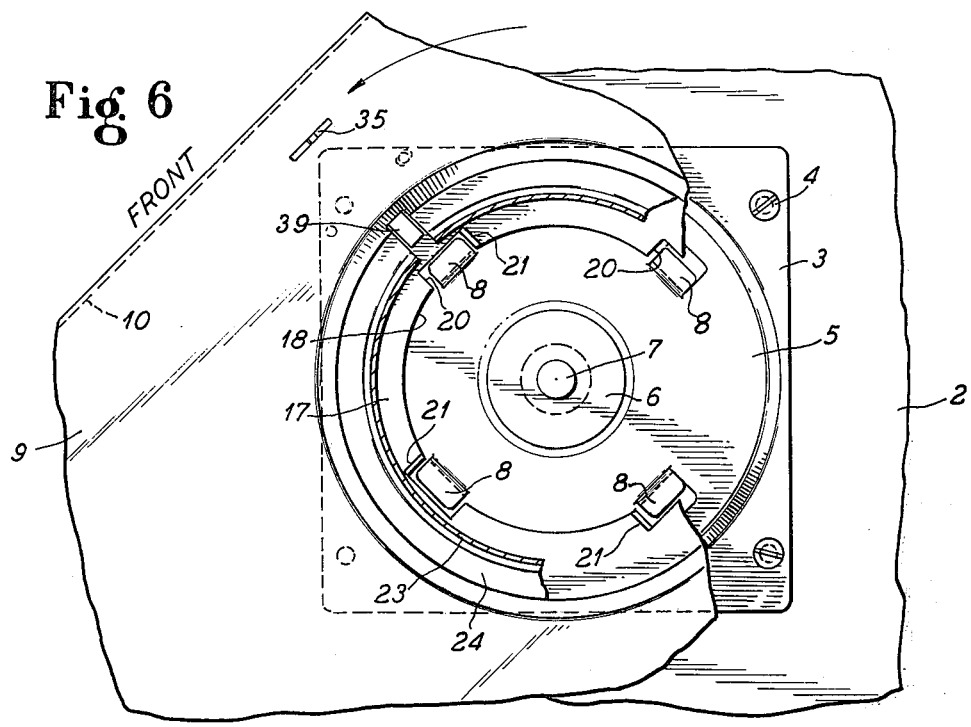
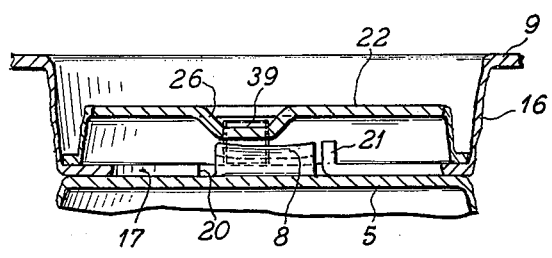
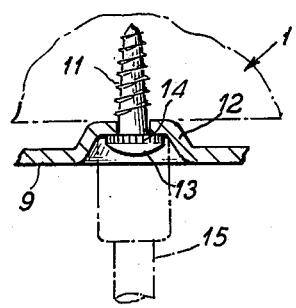

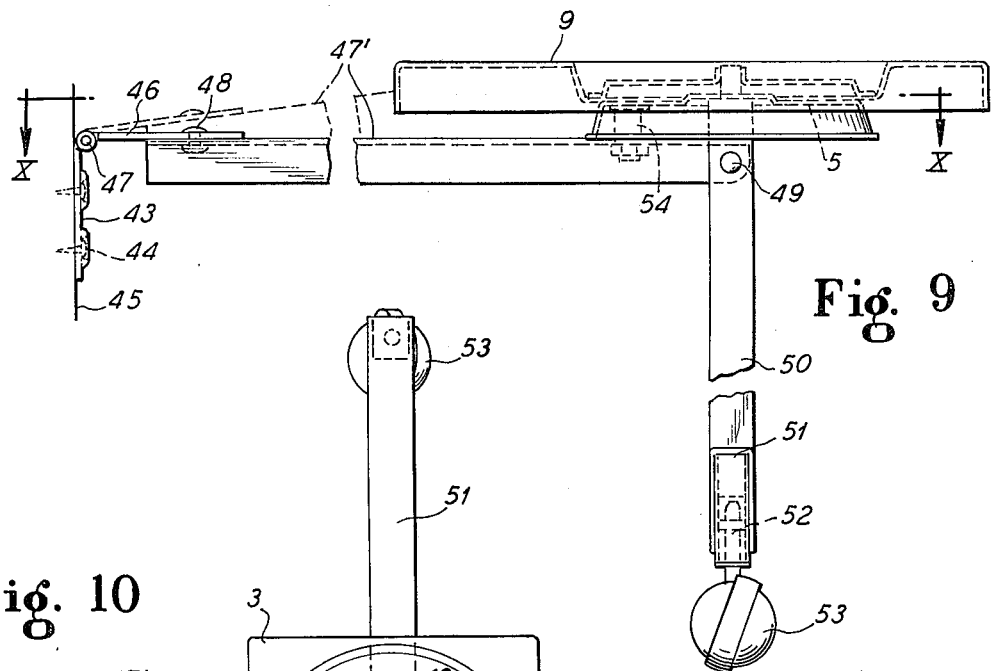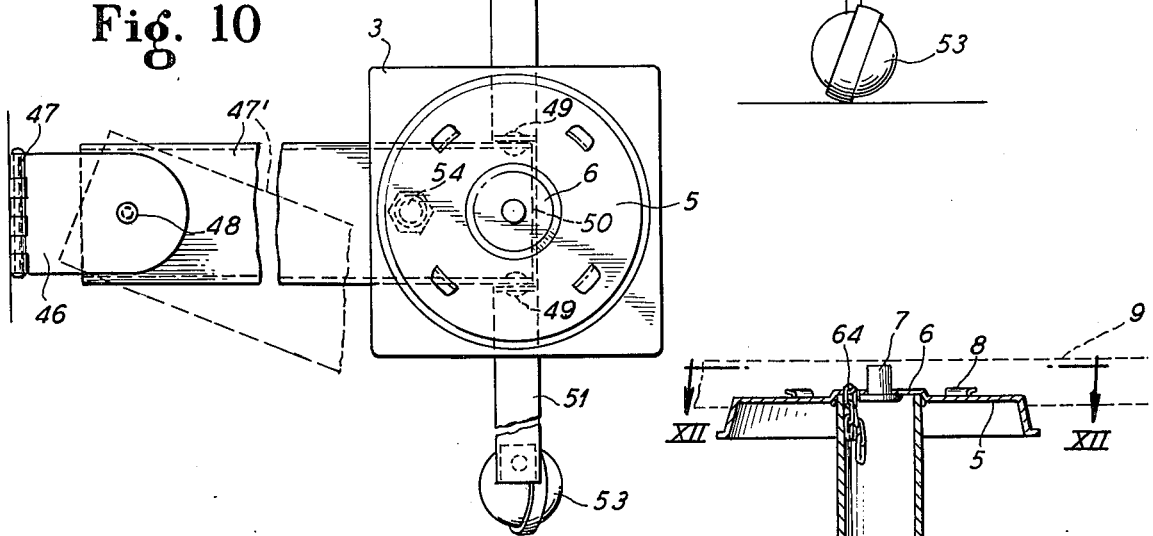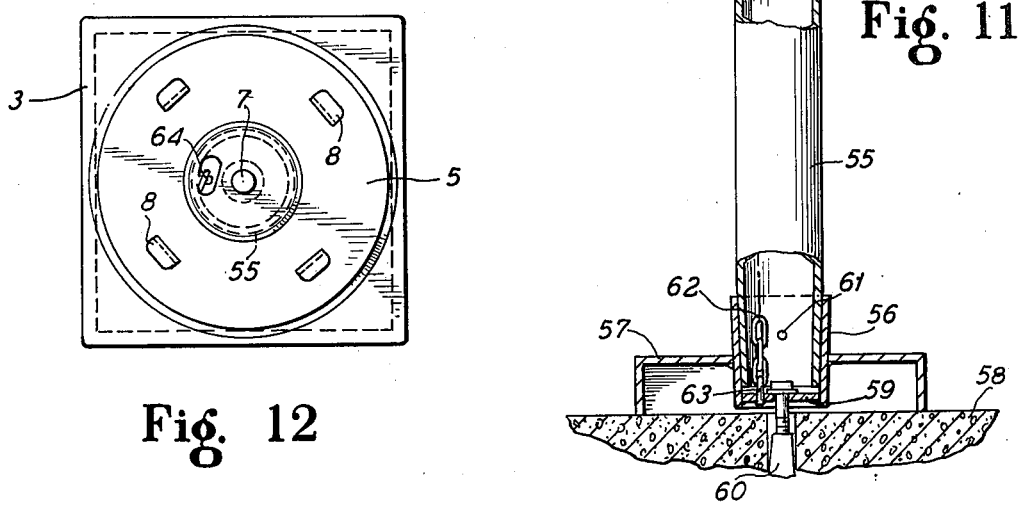

MOUNTING MEANS FOR TELEVISION SETS AND THE LIKE

BRIEF SUMMARY OF THE INVENTION

A tremendous number of television sets are stolen from motels, hotels, and similar places for public accommodation. Also, stereophonic equipment, radios, and other valuable apparatus are frequently stolen from homes, offices, and other locations. Accordingly, endevours have been made to utilize special mounting means to discourage theft of such articles, but mounting means made heretofore have not proven too successful, required an objectionable amount of handling and labor and, insofar as we are aware, were not such that a spare item could be previously equipped with a portion of the mounting means so that if the mounted item was out of order another could be substituted in a manner of a very few minutes.

The instant invention has been designed to overcome the above objections, and render it far more difficult for anyone to steal a mounted article, such as a television set, for example, and render it extremely easy and quick to replace a mounted article should the one in use need repairs. This, of course, renders a guest at a motel inconvenience to a minimum extent.

The supporting means upon which a television set or other valuable device may be mounted by way of the instant invention may be of substantially any desired character, such as a cabinet, pedestal, wall bracket, inter alia. A mounting means forming the subject matter of the instant invention remain the same regardless of the character of the supporting means.

The invention is divided substantially into two parts one of which is carried by the supporting means, and the other of which is carried by a plate secured to the underside of the object to be mounted on the support. These parts are each substantially of a table-like formation with the flat portions resting one upon the other and carrying interlocking means such as to permit limited rotation between the table members and also lock them together. One of the table-like portions is fitted with slots to pass over flanged brackets on the other member to permit separation of the parts, and when the parts are connected the slotted member may be rotated to pass beneath the flanges of the retaining brackets to establish interlocking between the parts. A locking assembly in the form of a bolt having a movable nut thereon secures the parts together and the head of the locking bolt is disposed within a housing and is so constructed that it can only be operated by means of a screwdriver having a socket on the end, and the bolt and the socket are of a character not commonly carried in a vehicle, thus discouraging theft of the mounted article. The screws holding the plate to the particular article are also mounted so as only to be reached and actuated by a proper socket member. Only one tool is necessary to operate both the screws and the locking bolt. In most cases, only the locking bolt is accessible.

A spare television set or other device equipped with a mounting plate and a portion of the mounting means may be kept handy for quick substitution for a mounted article in need of repairs. Should the shape of the mounted article be changed in shape during the course of the years, when new products are put out, it is only necessary to change the shape of the mounting plate, since the supporting means with its portion of the mounting means will remain. Thus, real economy of parts and labor is maintained.

Where a pedestal is utilized, such is generally set in to a floor socket, and special means are provided inside the pedestal to prevent separation of the pedestal from the socket.

In all instances, the various parts of the invention are made of heavy gauge steel which may be given any suitable finish to blend with either the mounted article or the decor of the room.

In the instance of this application, by way of example and not by way of limitation, the mounting means are utilized in connection with a television set.

Other and further objects, purposes, advantages, utilities, and features will be apparent to those skilled in the art from a reading of the present specification and drawings.

BRIEF DESCRIPTION OF THE DRAWINGS

FIG. 4 is a fragmentary enlargement of the locking structure seen in the left-hand end of FIG. 3, showing the same in released position;

FIG. 5 is a fragmentary part-sectional part-elevational view taken substantially as indicated by the line V—V of FIG. 4;

FIG. 6 is a fragmentary enlarged view, similar in character to FIG. 2, but showing the parts in position for separation and removal of the television set;

FIG. 7 is a fragmentary sectional view taken substantially as indicated by the line VII—VII of FIG. 4;

FIG. 8 is a fragmentary enlargement of the right-hand end of FIG. 3 illustrating how the mounting plate is locked or secured to the base of the television set;

FIg. 9 shows a modified arrangement wherein the television set, not shown, is mounted on a swingable frame secured to a wall bracket;

FIG. 10 is a fragmentary plan view of the structure of FIG. 9;

FIG. 11 is a part sectional, part elevational view indicating the mounting of a television set on a pedestal; and FIG. 12 is a top plan view of the structure of FIG. 11.

DETAILED DESCRIPTION

Figure 1:
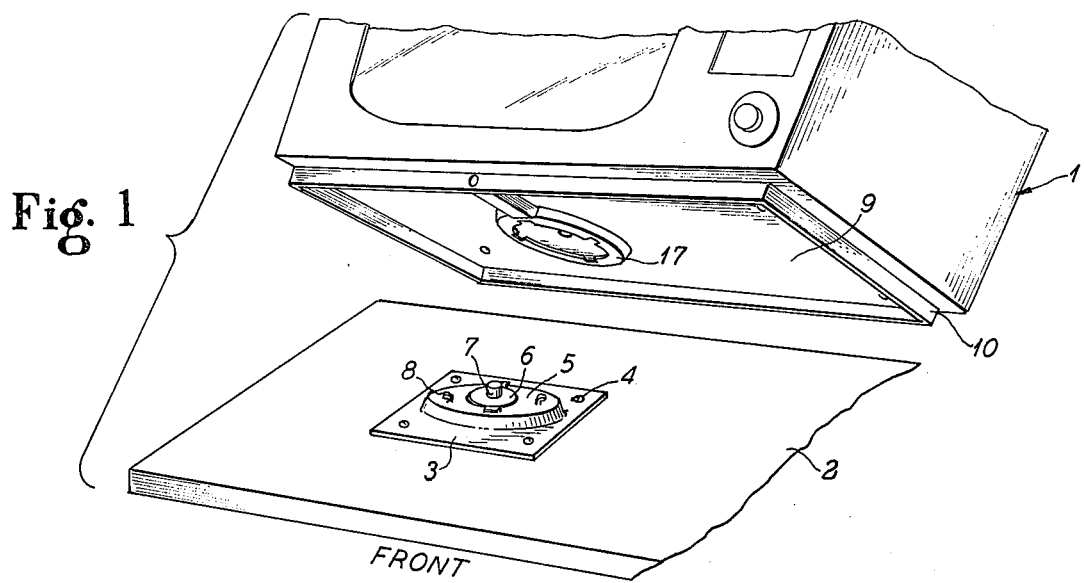
FIG. 1 is a fragmentary composite view illustrating the mounting of a television set on the top of a cabinet by means of the instant invention.

In the arrangement seen in FIGS. 1 to 8 inclusive there is shown an article, generally indicated by numeral 1, which may be a television set or other thing of value, and its mounting upon a supporting article 2 which may be the top of a cabinet-like piece of furniture. The mounting means, partially carried by each article, are such as to discourage theft of the mounted article.

A portion of the mounting means on the supporting article 2 in the illustrated instance comprises the supporting bearing base plate 3 which may be secured to the article 2 by a simple form of wood screw 4 having the usual cross slot in the head thereof, at each corner of the plate, because these screws will not be accessible as long as the television set remains mounted. Upstanding from the base 3 is a circular table 5 providing upwardly facing bearing area and having a further upstanding portion 6 centrally located and to which a pivot stud 7 is welded. Struck out of the table 5 is a plurality of evenly circumferentially spaced brackets bent to form upwardly projecting rigid angular connecting flanges 8 having overhanging interlock portions spaced above the top of table 5. In the illustrated instance there are four such brackets, but that number is not critical but convenient. Other than the openings made by striking out the spaced flanges 8 and the opening for the pivot pin 7, the upper surface of the table 5 is solid.

Secured to the bottom of the television set 1 or other mounted article is a metal mounting plate 9 having a downwardly turned flange 10 therearound. The plate substantially covers the bottom of the article 1 and is attached by one or more special screws 11 at each corner. A special screw is utilized because if the television or article 1 is mounted on a pedestal, the corner screws 11 might be accessible. In this regard, special securing or fastening means, such as screws, bolts, or other suitable elements are utilized and are of a type not operable by anything but a tool of a special type and which is seldom, if ever, carried in any vehicle except a delivery or repair vehicle. Formations are also provided so that only such a tool can be engaged with the particular fastening element. If a screw or bolt is utilized, there is no indentation in the head thereof, such as a diametral slot or groove, a Phillips head, an Allen head, or the equivalent, and the head is preferably round, having no polygonal head such as a lag screw.

With the foregoing in mind, by way of example in the illustrated instance, the plate 9 is indented and apertured as indicated at 12 to accommodate each screw 11. The head 13 of the screw 11 is shown round and without any indentation in the top of the head. This structure is best seen in FIG. 8. In the illustrated instance, the head immediately adjacent the base thereof is knurled as at 14 and the screw cannot be actuated except by a tool, indicated at dotted lines 15, having a socket on the end thereof with the interior of the socket constructed for interengagement with the knurling on the screw head. A pair of pliers or the like cannot be entered into the indentation and engage the screw head sufficient to actuate the screw. This arrangement clearly discourages theft of the television or other mounted article 1.

The plate 9 is provided with a centrally depressed mounting portion as indicated at 16 to provide a depending table with a downwardly facing bearing area 17 to rest upon the aforesaid table 5 on the supporting article 2. This table 17 is provided with a central aperture 18, so that the portion 17 can underlie the aforesaid flanges 8 on the table 5, and thus interlock with underlying areas of the mounting portions in response to limited relative rotary interlocking movement of the plates as indicated at 19 in FIG. 3. The depending table 17 is also provided with a plurality of slots 20, equally spaced and corresponding in number to the flanges 8 on the table 5, each such slot being of sufficient size to pass over a flange 8 when in alignment therewith. At one end of each slot there is an upstanding flange 21, as best seen in FIG. 7, which flange is of sufficient height to contact a flange 8 and prevent further rotation of the table 17 relatively to the table 5. The plate 9 also carries an upstanding platform 22 having a slightly sloping lateral depending edge 23 which terminates in an annular flange 24 welded to the upper face of the table 17. This platform covers the interengagement between the table 17 and the flanges 8 on the table 5. The platform is also apertured and flanged as at 25 for pivotal movement around the pin 7. The platform 22 is also provided with a depression to form a stop 26 for a portion of the locking mechanism that holds the table 17 in interlocked engagement with the flanges 8 on the table 5, and which will now be described.

Figure 3:
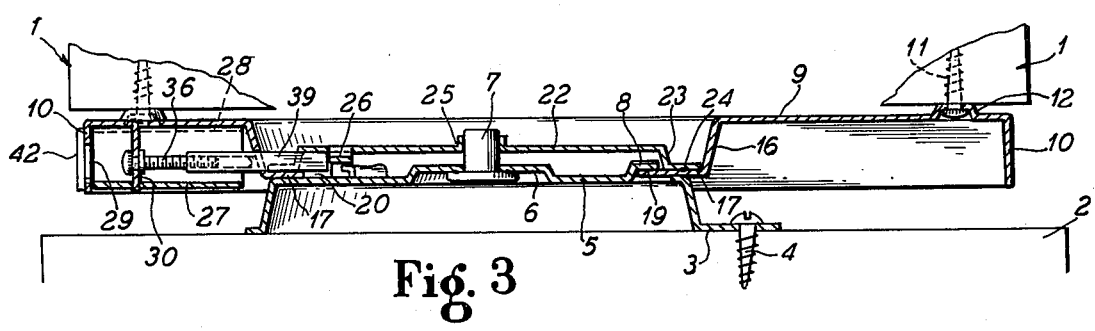
FIG. 3 is an enlarged vertical sectional view taken substantially as indicated by the staggered section line III—III of FIG. 2.

The locking means are mainly contained in a housing 27 which is substantially U-shaped and provided with the top with outstanding opposed flanges 28—28 welded to the underface of the plate 9, as best seen in FIGS. 3, 4 and 5. This housing is closed at its outer end by the flange 10 on the plate 9, except for an opening 29 in the flange to admit a tool 15 shown in dotted lines in FIG. 4, into the housing. Spaced a distance inwardly from the flange 10 is a partition 30 extending entirely across the housing and provided with a slot 31 partially through the partition. As best seen in FIG. 5, the housing 27 and plate 9 are both provided with slots so that four shortened portions 32, 33, and 34 of the partition will extend through the housing while a portion 35 of the partition extends through the plate 9. When so mounted, of course, the partition cannot be moved in any direction. A bolt 36 is disposed within the housing, and this bolt has a collar 37 disposed on the inner side of the partition 30 and a head 38 disposed on the outer side of the partition 30, the spaced therebetween. Consequently, when this bolt is disposed in the slot 31. Consequently, when this bolt is actuated it cannot move except rotatively. The head of this bolt 38 is preferably of the same construction as the head of the screw 11 previously described in connection with FIG. 8, so that the same socket tool 15 might be used on this head as well as on each of the screws 11. Associated with the bolt 36 is an elongated nut 39 having an internally threaded aperture at one end and being solid at the other end. This nut 39 is preferably shaped cross-sectionally to have a flat face extending through an aperture 40 in the adjacent depressed wall 16 of the plate 9, and riding upon the table 17. A satisfactory cross-sectional shape for the nut is square, the hole 40 in the wall 16 may be the same shape as the nut.

In assembling this locking system, it is a simple expedient to spread the sides of the housing 27 apart to insert the bolt 36 and partition 30 within the housing, then bring the walls of the housing together so that they will be perpendicular to the plate 9, and weld the wings or flanges 28—28 of the housing to the plate.

Figure 2:
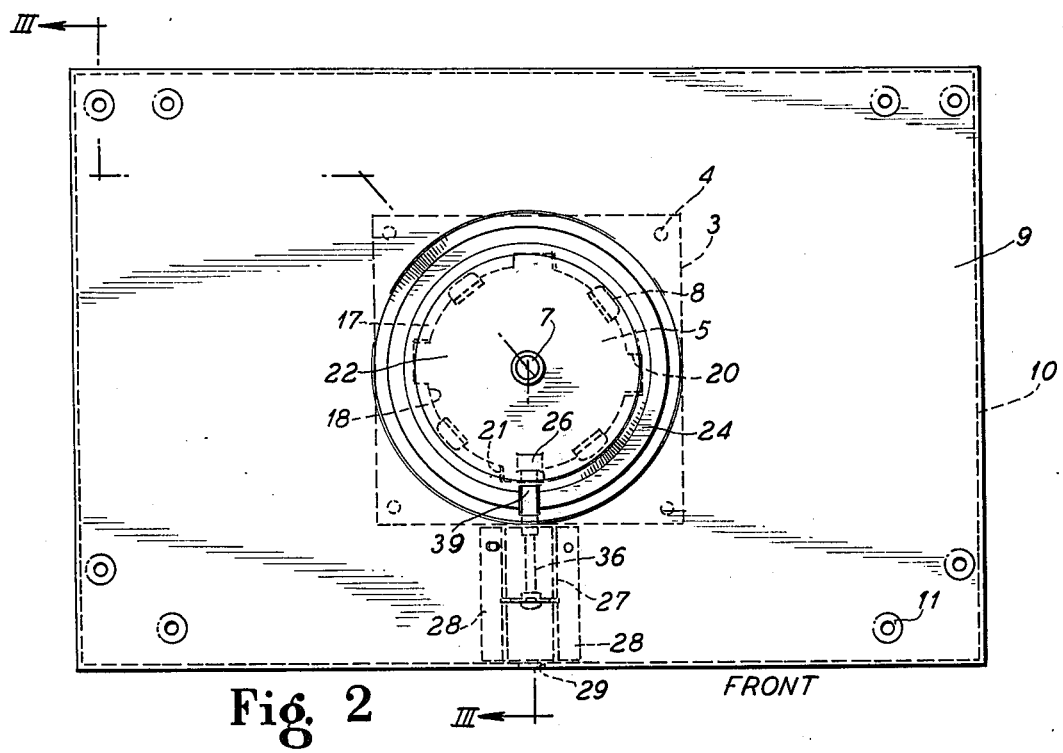
FIG. 2 is an enlarged plan view of the structure seen in FIG. 1 with the television set itself removed for purposes of clarity.

In FIGS. 2 and 3, the locking mechanism is shown in locked position. As seen in FIG. 3, the bolt 36 has been rotated to advance the elongated nut 39 through an opening 41, FIG. 4, until the nut strikes the stop 26, this stop preventing erroneous removal of the elongated nut entirely from the bolt. In this position, the nut riding the table 17 extends over a portion of the slot in that table and underlies the platform 22 providing an additional hold to the interlocking of the table 17 with all of the flanges 8 carried on the table 5, as seen in FIG. 2. From this position, the plate 9 cannot be turned counterclockwise as viewed in FIG. 2 owing to the fact that the upstanding flange 21 at one end of the slot over which the nut 39 extends will contact the nut. Should the plate 9 be rotated clockwise, the flanges 21 will contact the holding flanges 8 on the plate 5 in a manner preventing a slot from underlying any of the flanges 8.

In order to remove the television or mounted article 1 from the table 5, the nut 39 must be retracted by use of a special tool to the position seen in FIG. 4 and then the plate 9 with the article thereon may be rotated counterclockwise until it is stopped by contact of the flanges 21 with the holding flanges 8 as seen more clearly in FIG. 6, at which time the mounted article may be lifted off the table 5 by virtue of a slot 20 passing over each of the holding flanges 8.

It will be noted from the structure described that the television set or other mounted article 1 is so mounted as to rather thoroughly discourage theft of it, by virtue of the necessity of the use of a special tool not commonly carried in a vehicle. To further discourage a possible thief, the access opening 29 to the bolt 36 through the flange 10 may be entirely covered by a snap-in disk 42 as indicated in FIG. 3. This disk could be round, or rectangular, and of the same height as the flange, and bear indicia thereon symbolizing either the manufacturer of the mounted article or the present owner of that article. Usually a possible thief will not remove such identification to see what might be behind it.

The television set or mounted article 1 may also be mounted on other supporting articles in addition to a cabinet-like article 2. To this end, we have illustrated in FIGS. 9, 10, 11 and 12 two different supporting arrangements for the mounted article, by way of example but not by way of limitation. In each instance, since the same mounting means as above described are utilized, we have indicated in FIGS. 9 and 10 just the table 5 and the plate 9 together with the structure attached thereto; and in FIGS. 11 and 12, we have indicated the table 5 and dotted in the position for the plate 9.

In FIGS. 9 and 10, the supporting means are in the form of a pedestal which may be pivoted laterally and vertically. In this instance, a bracket 43 is secured by means diagrammatically shown at 44, to a wall or the like 45. The securement means 44 are firm and strong and of any suitable type, depending upon the character of the wall. An outstanding bracket 46 is hinged as at 47 to the wall bracket 43, the hinge being supported horizontally to permit vertical pivotal movement of the bracket 46 relatively to the wall. An outwardly extending channel-shaped arm 47 is pivoted to the bracket 46 as indicated at 48 so that the arm 47 may move laterally with respect to the bracket as indicated by the dotted lines in FIG. 10. The downwardly extending side flanges on the member 47 are pivoted as at 49—49 to the upper portion of a vertically disposed pedestal 50, in this instance also of channel shape and welded at its top to the underside of the table 5. Extending in opposite directions away from the sides of the pedestal 50 near the bottom thereof, is a pair of like inverted channel arms 51—51, the adjacent ends of which are welded to the pedestal. Each of these arms has socket means therein to receive the shanks 52—52 of a pair of carpet casters 53—53 or the equivalent.

With the structure of FIGS. 9 and 10, the television set or other mounted article may be moved laterally on the casters 53 around the pivot point 48 to facilitate proper positioning and also make free and easy room for vacuum cleaning. At the same time, the entire supporting means and mounted article may be elevated vertically around the hinge 49 as indicated by dotted lines in FIG. 9 in order to permit carpeting to be drawn under the casters 53. Because of that vertical movement and the pivot point 49, it is deemed best to place a stabilizing bolt secured to the underside of the table 5 and connected with the channel arm 47 to maintain proper balance of the mounted article.

In FIGS. 11 and 12 we have shown how an article may be mounted by the same mounting means above described on a round fixed pedestal 55 welded at the top to the portion 6 of the table 5. This pedestal seats within a socket element 56 with a stabilizing frame 57 therearound on a floor such as a concrete floor 58. The socket is maintained in position by being closed at the bottom by a partition 59 through which an anchoring bolt 60 embedded in the floor is utilized. The pedestal 55 is pinned to the socket by means of a cross pin 61 but added protection is provided in the event that pin was knocked out. In the illustrated instance, that added protection is in the form of a chain 62 extending upwardly through the pedestal 55, anchored at its lower end to the bottom closure 59 as indicated at 63 and anchored at its upper end to the portion 6 of the table 5, a location extremely difficult of access unless the mounted article has been removed from the supporting structure.

We claim:

1. Mounting means for removably connecting an article of some value in upright position on a supporting means in a manner to discourage theft of the article, said mounting means comprising:

a mounting plate having means for securing it onto the bottom of the article;

said mounting plate having a central depressed mounting portion provided with a downwardly facing bearing area;

a complementary supporting bearing plate having means for securing it fixedly to the supporting means and provided with an upwardly facing bearing area with which said downwardly facing bearing area is in article supporting bearing relation;

said bearing plate upwardly facing area having a series of circumferentially spaced upwardly extending rigid angular connecting flanges provided with overhanging interlock portions;

said mounting portion having a plurality of circumferentially spaced slots and said connecting flanges extending upwardly through said slots and with said interlock portions in interlocking overlying relation to underlying areas of said mounting portion in response to limited relative rotary interlocking movement of said plates; and means for releasably locking said plates against relative rotary unlocking movement.

2. Mounting means according to claim 1, wherein said mounting plate is of a size to substantially cover the underside of the article, and a depening skirt flange extending entirely around the perimeter of said mounting plate and concealing said supporting plate.

3. Mounting means according to claim 2, wherein said skirt flange is apertured at one point and said locking means are accessible through the aperture.

4. Mounting means according to claim 3, wherein said locking means comprise a housing secured to the underside of said mounting plate, a partition in said housing, a rotary bolt extending through said housing, means preventing longitudinal movement of said bolt, an elongated nut threadedly engaged with said bolt and having a solid rod end portion movable longitudinally into and out of an interlock slot in means on said supporting plate and limiting relative movement of said plate sufficiently to prevent disengagement of said interlock portions of said flanges from said underlying areas when said rod end portion is in said slot, said bolt being accessible by means of a tool inserted through said aperture in the skirt flange.

5. Mounting means according to claim 4, including lug means on said supporting plate engageable with said rod end portion for limiting said relative rotary movement of the plates.

6. Mounting means according to claim 1, including a pedestal to the top of which said supporting plate is welded, a socket member having means for firmly anchoring it to a floor, stabilizing means around said socket member, said pedestal being seated in said socket member, and means pinning said pedestal to the socket member.

7. Mounting means according to claim 6, wherein said pedestal is hollow, and an elongated holding member within the pedestal attached to the bottom of said socket at one end and attached to said supporting plate at its opposite end, whereby if the connection effected by the pin means is broken the pedestal cannot be removed from the socket.

* * * * *